US006907846B2

(12) United States Patent
Hur et al.

(10) Patent No.: US 6,907,846 B2
(45) Date of Patent: Jun. 21, 2005

(54) CONDENSING GAS BOILER HAVING STRUCTURE OF PREVENTING CORROSION CAUSED BY USING HETEROGENEOUS METAL

(75) Inventors: Woo Suk Hur, Pyeongtaek-Shi (KR); Youn Cheol Shin, Incheon (KR)

(73) Assignee: Kyungdong Boiler Co., Ltd., Gyonggi-Do (KR)

( * ) Notice: Subject to any disclaimer, the term of this patent is extended or adjusted under 35 U.S.C. 154(b) by 39 days.

(21) Appl. No.: 10/677,424

(22) Filed: Oct. 2, 2003

(65) Prior Publication Data

US 2005/0039703 A1 Feb. 24, 2005

(30) Foreign Application Priority Data

Oct. 2, 2002 (KR) ...................... 10-2002-0060264
Oct. 2, 2002 (KR) ...................... 10-2002-0060265

(51) Int. Cl.[7] .............................................. F22B 5/04
(52) U.S. Cl. ...................... 122/32; 122/20 B; 122/18.1
(58) Field of Search .............................. 122/15.1, 18.1, 122/20 B, 32, 33; 110/234, 254; 266/155

(56) References Cited

U.S. PATENT DOCUMENTS 4,173,949 A * 11/1979 Roethe ........................ 122/1 C
4,524,726 A * 6/1985 Bindl ......................... 122/15.1
6,662,758 B1 * 12/2003 Shin ........................... 122/18.1

* cited by examiner

Primary Examiner—Gregory Wilson
(74) Attorney, Agent, or Firm—Devine, Millimet & Branch, PA; Paul C. Remus; Michelle Saquet Temple

(57) ABSTRACT

A condensing gas boiler having a corrosion prevention structure of preventing corrosion caused by using heterogeneous metal is provided, which includes a casing provided with a combustion chamber therein; a present heat exchanger arranged in the casing, which includes a first tubular tube made of a copper material having a plurality first thermal pins formed by processing an outer circumferential surface; a latent heat exchanger disposed at a distance from the present heat exchanger, which includes a second tubular tube whose inner portion is made of a copper material and whose outer portion is made of aluminum, having a plurality second thermal pins formed by processing an outer circumferential surface; end plates contacting and engaged with each other while the present heat exchanger and the latent heat exchanger are fixedly arranged in respective rows and installed in the casing; and a plurality of connection tubes which are mutually connected through a connection portion so that water can circulate through the present heat exchanger and the latent heat exchanger, wherein connection tubes which are made of a corrosion-resistant material are installed to have a broader area, and simultaneously connection tubes which are made of a corrosion-easy material are installed to have a smaller area, to thereby suppress galvanic corrosion through an unfavorable area ratio, and wherein an insulator for electrical insulation is provided between the end plates. Galvanic corrosion or stay current corrosion caused by using heterogeneous metal between the present and latent heat exchangers is suppressed, to thereby enhance durability of a product and thus heighten reliability of the product.

5 Claims, 5 Drawing Sheets

CONDENSING GAS BOILER HAVING STRUCTURE OF PREVENTING CORROSION CAUSED BY USING HETEROGENEOUS METAL

BACKGROUND OF THE INVENTION

1. Field of the Invention

The present invention relates to a condensing gas boiler having a structure of preventing corrosion caused by using heterogeneous metal, that is, different kinds of metal, and more particularly, to a condensing gas boiler having a corrosion prevention structure of preventing corrosion caused by using heterogeneous metal, in which galvanic corrosion or stay current corrosion caused by using heterogeneous metal between the present and latent heat exchangers is suppressed, to thereby enhance durability of a product and thus heighten reliability of the product.

2. Description of the Related Art

A boiler for use in general homes and buildings is used for heating water and supplying hot water, which is divided into a fuel oil boiler and a fuel gas boiler, according to a type of a fuel used.

When a fuel oil boiler and a fuel gas boiler each having an identical capacity are compared with each other, the former is cheaper than the latter in view of its purchasing price, but the latter is more economic than the former in view of an amount of fuel consumed.

However, consumer's expenses are almost same on a long-term basis in both cases of a fuel oil boiler and a fuel gas boiler.

Thus, fuel gas boilers are used in places where city gas is supplied, but fuel oil boilers are used in other places where city gas is not supplied.

Meanwhile, in the case of a fuel gas boiler, vapor generated in the course of burning gas contacts low-temperature matter or air to then be changed into water ($H_2O$). In this case, heat energy is created.

A gas boiler which is designed to re-absorb the generated heat in order to heighten a thermal efficiency, is called a condensing gas boiler.

Such a condensing gas boiler has a thermal efficiency higher than that of an ordinary gas boiler and also can save a fuel cost remarkably. Accordingly, the condensing gas boilers are being widely used.

The conventional condensing gas boiler uses combustion heat generated by burning gas with a heating burner and directly heats circulation water, and re-absorbs condensed latent heat in exhaust gas, to thus heighten a thermal efficiency.

For this purpose, the present and latent heat exchangers are provided along a height direction, and are connected with each other through a connection portion having a plurality of connection tubes so that water can circulate therebetween.

Considering the thermal efficiency, the present and latent heat exchangers in the condensing gas boiler are made of a material of copper.

However, an internal heat exchanger is corroded due to acid moisture generated at the time of a condensation process, and sulfuric oxide, nitric oxide, and combustion heat included in exhaust gas. To suppress it, aluminium or stainless steel having a corrosion-resistant property is used for the heat exchanger.

Although aluminium or stainless steel has a good corrosion-resistant property, its thermal efficiency is low. Thus, the heat exchanger should be designed in a large size in order to assume an identical calory. As a result, the condensing gas boiler cannot be made compact.

Accordingly, it has been recently proposed of the present heat exchanger which is little exposed to condensed water is made of a copper material and the latent heat exchanger which is apt to be exposed to condensed water has a double structure is made of the inner portion thereof is a copper material and the outer portion thereof is aluminum.

However, since the present and latent heat exchangers are made of heterogeneous metal in the condensing gas boiler having the above-described structure heat exchanger, corrosion caused by a flow of current due to a potential difference between respectively different kinds of metal at a connection portion connecting the present and latent heat exchangers, that is, galvanic corrosion, or stay current corrosion due to an electromotive force between the respectively different kinds of metal, has occurred.

Thus, the conventional condensing gas boiler has a problem of corrosion. As a result, durability of a product is not only lowered, but also reliability of the product is lowered.

SUMMARY OF THE INVENTION

To solve the above problems, it is an object of the present invention to provide a condensing gas boiler having a corrosion prevention structure of preventing corrosion caused by using heterogeneous metal, in which galvanic corrosion or stay current corrosion caused by using heterogeneous metal between the present and latent heat exchangers is suppressed, to thereby enhance durability of a product and thus heighten reliability of the product.

To accomplish the above object of the present invention, there is provided a condensing gas boiler having a corrosion prevention structure of preventing corrosion caused by using heterogeneous metal, the condensing gas boiler comprising: a casing provided with a combustion chamber therein; a present heat exchanger arranged in the casing, which includes a first tubular tube made of a copper material having a plurality first thermal pins formed by processing an outer circumferential surface; a latent heat exchanger disposed at a distance from the present heat exchanger, which includes a second tubular tube whose inner portion is made of a copper material and whose outer portion is made of aluminum, having a plurality second thermal pins formed by processing an outer circumferential surface; end plates contacting and engaged with each other while the present heat exchanger and the latent heat exchanger are fixedly arranged in respective rows and installed in the casing; and a plurality of connection tubes which are mutually connected through a connection portion so that water can circulate through the present heat exchanger and the latent heat exchanger, wherein connection tubes which are made of a corrosion-resistant material are installed to have a broader area, and simultaneously connection tubes which are made of a corrosion-easy material are installed to have a smaller area, to thereby suppress galvanic corrosion through an unfavorable area ratio, and wherein an insulator for electrical insulation is provided between the end plates.

Here, it is preferable that at least a part of the connection portion is insulated.

Preferably, an insulation packing is interposed between the connection portion and the latent heat exchanger, in order to insulate the contacting surface between the connection portion and the latent heat exchanger.

Preferably, an insulation material is interposed between the end plates to accomplish an insulation packing, or the contacting surface of the end plates is insulated and coated, as an embodiment of the insulator provided between the end plates.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE INVENTION

Figure 1:
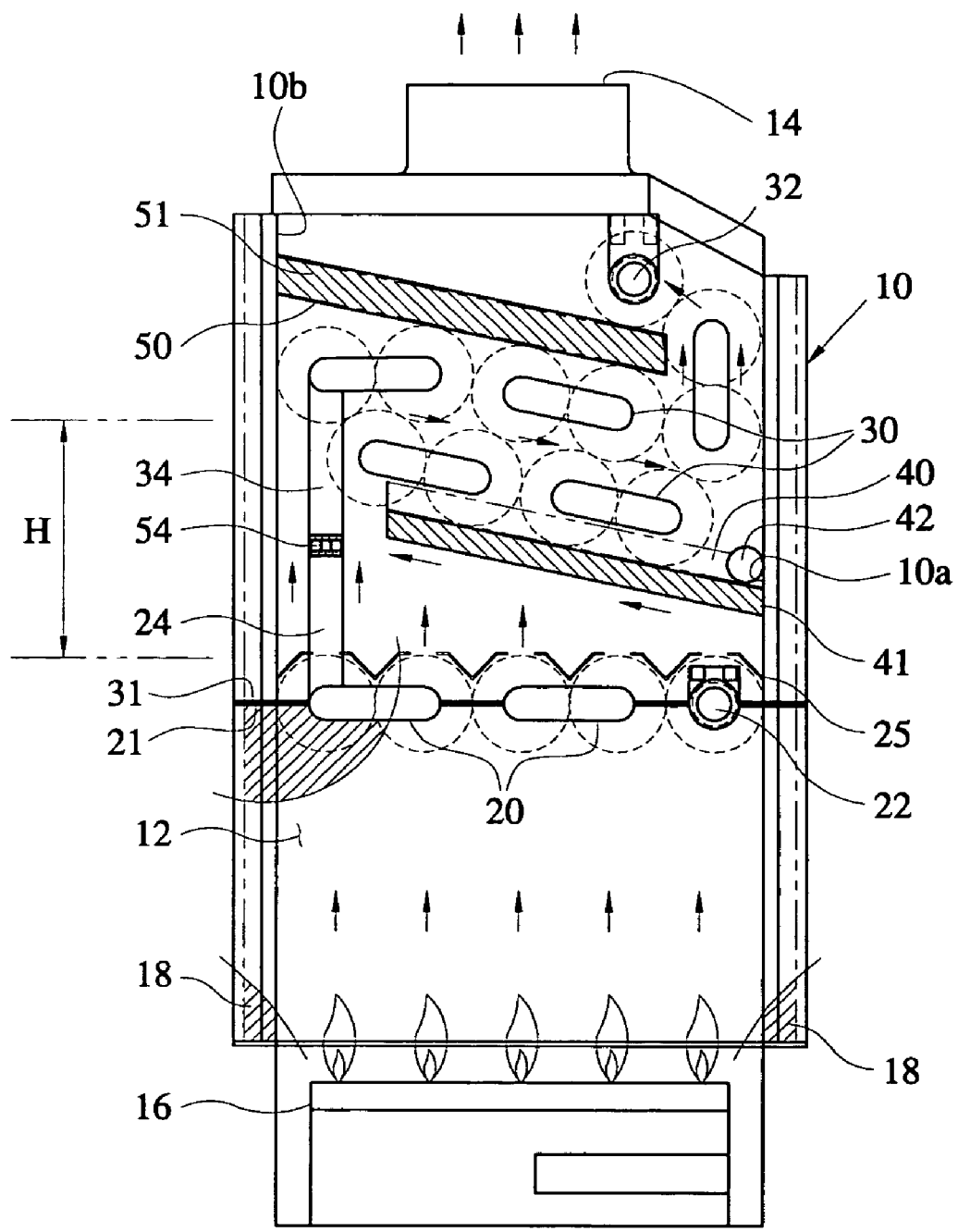
FIG. 1 is a configurational diagram schematically showing a condensing gas boiler according to the present invention.

Preferred embodiments of the present invention will be described with reference to the accompanying drawings. The same or like elements are assigned with the same or like reference numerals.

As shown in FIGS. 1 through 5, a condensing gas boiler according to the present invention includes a casing 10 which forms an outer case and includes a combustion chamber 12 therein.

A heat isolation material 18 is filled in the side walls of the casing 10, in order to suppress heat in the combustion chamber 12 from being externally radiated to thus heighten a combustion efficiency. An exhaust gas exit 14 is formed on the upper portion of the casing 10.

In this case, if the exhaust gas exit 14 is integrally formed on the upper portion of the casing 10 toward a latent heat exchanger 30 to be described later, without a separate exhaust gas guiding plate (not shown), the present invention can achieve compactness of the boiler and save the manufacturing cost.

A pre-mixing gas burner 16 is provided below the casing 10, in order to heat the combustion chamber 12 in an uptrend combustion type, and discharges a comparatively small amount of $NO_x$ and CO harmful for atmosphere during heating, and has a high efficiency.

With the pre-mixing burner 16, the gas boiler can be made compact and designed in a large capacity.

A present heat exchanger 20 which is fixed by an end plate 21 and arranged in a row is provided on the central portion of the combustion chamber 12.

The present heat exchanger 20 uses heat generated by combustion from the pre-mixing gas burner 16, and heats circulation water directly.

The present heat exchanger 20 is disposed slantly with a predetermined slope with respect to a horizontal axial line on a cross-sectional surface of the casing 10, so that the exhaust gas can smoothly flow and also a heat transfer area can be maximized.

The inner portion of the present heat exchanger is formed of a first tubular tube 20a made of a material of copper through which water flows, and the outer portion thereof is formed of a plurality of first thermal pins 20b extended outwards radially from the outer circumferential surface of the first tube 20a.

A circulation water exit adaptor 22 through which circulation water is discharged, is installed in one of the present heat exchangers 20.

Meanwhile, a plurality of exhaust gas resistant bodies 25 are provided on the upper portion of each present heat exchanger 20 so that a maximized heat exchanging efficiency is accomplished up to the rear surface of the present heat exchanger 20 according to the exhaust gas resistance.

Here, the respective exhaust gas resistant bodies 25 are disposed mutually spaced with a space for flow of the exhaust gas, and form a shape of "V" substantially.

However, in addition to a shape of "V", the respective exhaust gas resistant bodies 25 form a variety of shapes such as a circle, a diamond, a diamond whose sides are bent, an inverted triangle, and a sea gull shape.

A plurality of latent heat exchangers 30 are provided on the upper portion of the present heat exchanger 20.

The latent heat exchanger 30 is also disposed slantly with a predetermined slope with respect to a horizontal axial line on a cross-sectional surface of the casing 10, at a state where the latent heat exchanger is fixed by an end plate 31 and arranged in a row, like the present heat exchanger 20.

Here, the latent heat exchanger 30 is disposed in the same area as that of the present heat exchanger 20, along the vertical direction in which combustion heat generated by the pre-mixing gas burner 16 proceeds toward the exhaust gas exit 14.

Thus, the heat transfer area is maximized and the present heat and condensing conditions are made, to thereby improve a heat exchanging efficiency, and to accomplish compactness of the boiler.

Figure 2A:
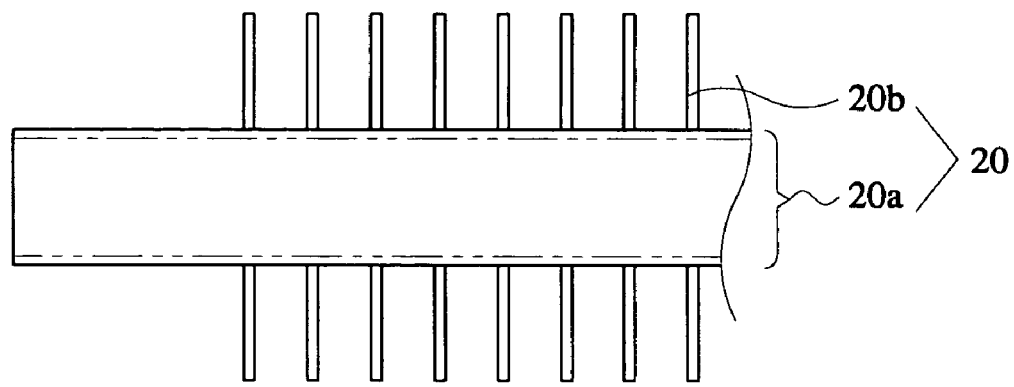
FIGS. 2A and 2B are configurational diagrams schematically showing heat exchangers in present and latent heat portions, respectively.
Figure 2B:
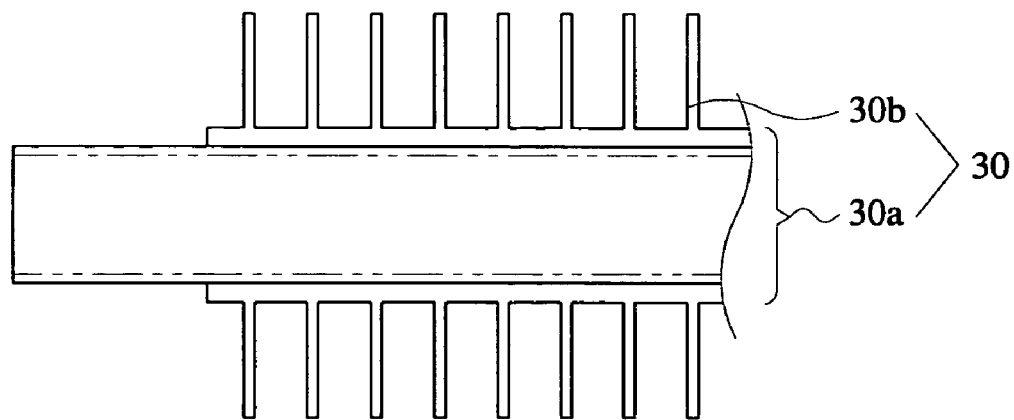

In particular, as shown in FIG. 2B, the inner portion of the latent heat exchanger 30 is made of a material of copper so that water can flow therein and the outer portion thereof is formed of a second tubular tube 30a made of a material of aluminium, unlike the present heat exchanger 20. The outer portion of the latent heat exchanger 30 is formed of a plurality of second thermal pins 30b extended outwards radially from the outer circumferential surface of the second tube 30a.

In this embodiment, the latent heat exchanger 30 is arranged in a row along the lateral direction of the boiler. However, the latent heat exchanger 30 can be arranged in a two-stage configuration, a multiple structure, and a multiple arrangement form. Also, the latent heat exchanger 30 can be separately arranged as desired.

A circulation water entrance adaptor 32 through which circulation water goes in, is provided in one end of the latent heat exchanger 30.

A condensed waterspout 40 is provided in parallel between the present heat exchanger 20 and the latent heat exchanger 30, in which one end of the condensed waterspout 40 contacts an internal one wall surface 10a of the casing 10, and the other end thereof is disposed spaced from the other internal wall surface 10b.

Exhaust gas can flow through a space disposed spaced from the other internal wall surface 10b.

A condensed water exit 42 for discharging the condensed water generated in the heat exchanging process of the latent heat exchanger 30 and collected in the condensed waterspout 40 is formed in one end of the condensed waterspout 40.

An exhaust gas flowing plate 50 is provided on the upper portion of the latent heat exchanger 30, in order to guide the exhaust gas having flown through the present heat exchanger 20.

The condensed waterspout 40 and the exhaust gas flowing plate 50 has a double layer of air, whose side walls are made of heat isolation materials 41 and 51.

Meanwhile, as described above, the first and second tubes 20b and 30b of the present and latent heat exchangers 20 and 30 are made of different kinds of metal. The present and latent heat exchangers 20 and 30 are mutually connected with a connection portion 54 formed by connecting a plurality of connection tubes 24 and 34 with nuts or clips.

As described above, since the present and latent heat exchangers 20 and 30 are made of different kinds of metallic materials, corrosion caused by a flow of current due to a potential difference between respectively different kinds of metal at a connection portion connecting the present and latent heat exchangers, that is, galvanic corrosion, or stay current corrosion due to an electromotive force between the respectively different kinds of metal, is apt to occur.

Thus, the present invention has pursued enhancement of durability of the condensing gas boiler by suppressing a corrosion proceeding speed.

For this purpose, the connection tubes 24 and 34 connecting between the present and latent heat exchangers 20 and 30 are made short in their lengths so that a spacing H (FIG. 1) of the connection portion 54 becomes as narrow as possible. Also, the cross-sectional area of the present and latent heat exchangers 20 and 30 becomes as small as possible so that a heat transfer area becomes small.

In particular, when the plurality of connection tubes 24 and 34 forming the connection portion 54 are made of different kinds of metal, connection tubes which are made of a corrosion-resistant material are installed to have a broader area, and simultaneously connection tubes which are made of a corrosion-easy material are installed to have a smaller area, among the connection tubes 24 and 34, to thereby retard a galvanic corrosion proceeding speed.

The reason is to suppress galvanic corrosion through an unfavorable area ratio.

As described above, the length of the connection portion 54 is made as short as possible, and the area thereof is also made as small as possible. Also, connection tubes which are made of a corrosion-resistant material are installed to have a broader area, and simultaneously connection tubes which are made of a corrosion-easy material are installed to have a smaller area, among the connection tubes 24 and 34, to thereby retard a galvanic corrosion proceeding speed at maximum.

Thus, the condensing gas boiler enhances durability thereof and thus heightens reliability thereof.

However, the present invention additionally includes the following configuration, in order to further suppress a galvanic corrosion proceeding speed.

Figure 3A:
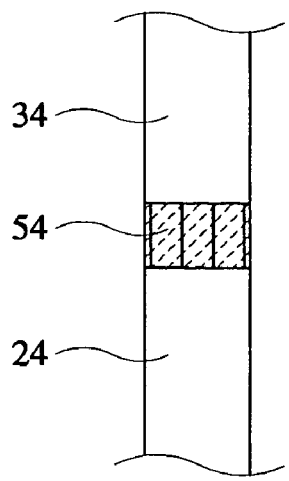
FIGS. 3A and 3B show an embodiment showing an insulation state of a connection portion in connection tubes, respectively.

That is, a partial section of the connection portion 54 is insulated. The simplest way of insulating the partial section of the connection portion 54 is shown in FIG. 3A. As shown in FIG. 3A, the surface of the connection portion 54 is coated with a coating material as depicted as oblique dotted lines, to thereby electrically insulate the connection portion 54.

Figure 3B:
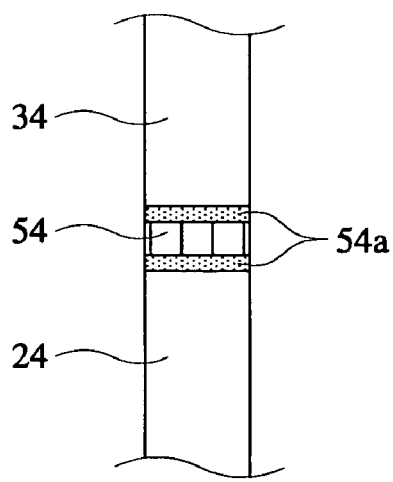

Besides, as shown in FIG. 3B, an insulator 54a can be provided in a partial section of the connection portion 54.

Figure 4A:
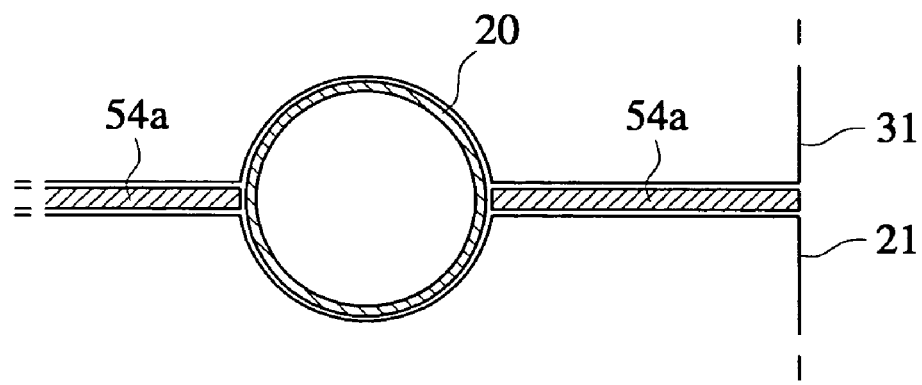
FIGS. 4A and 4B show an embodiment of an insulation state of each end plate.

In the present invention, as shown in FIG. 4A, an insulator 54a insulates a spacing between the end plates 21 and 31 which mutually connects the present and latent heat exchangers 20 and 30, through an insulation packing work, at a state where the present and latent heat exchangers 20 and 30 are fixed and disposed in a row, respectively, as well as the connection portion 54 mutually connecting the plurality of connection tubes 24 and 34, to thereby much more remarkably suppress a galvanic corrosion proceeding speed or a stay current corrosion proceeding speed.

Figure 4B:
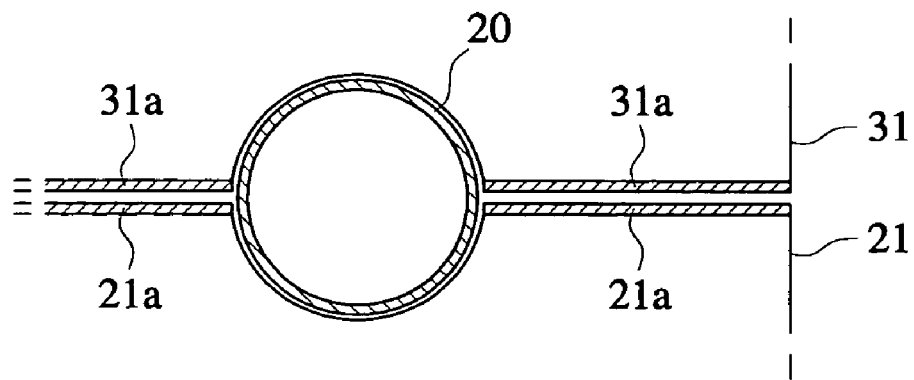

As shown in FIG. 4B, the contacting surface between the end plates 21 and 31 can be insulated and coated with coating materials 21a and 31a, to thereby suppress a galvanic corrosion proceeding speed or a stay current corrosion proceeding speed.

As described above, insulation of the connection portion 54 and the spacing between the end plates 21 and 32 can suppress corrosion proceeding speeds of galvanic corrosion or stay current corrosion caused between the different kinds of metal used in the present and latent heat exchangers 20 and 30.

Figure 5:
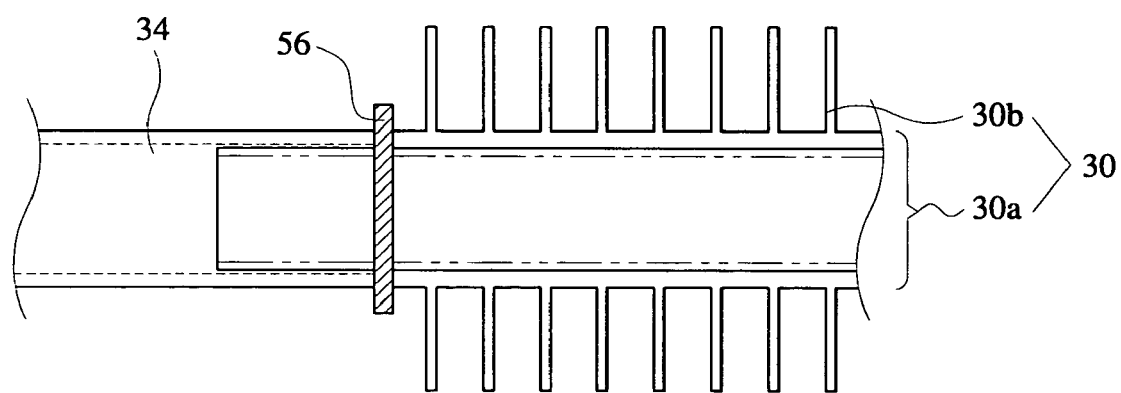
FIG. 5 shows a contacting region between the connection tube and the latent heat exchanger.

Meanwhile, FIG. 5 shows a contacting region between the connection tube 34 and the latent heat exchanger 30.

In case of the latent heat exchanger 30 unlike the present heat exchanger 20, the latent heat exchanger 30 employs a double structure in which the inner portion thereof is made of copper and the outer portion thereof is made of aluminum, considering corrosion caused by condensed water. Here, since the outer circumferential surface of the latent heat exchanger 30 contacting the connection tube 34 is made of aluminum, galvanic corrosion can be caused by contact between the different kinds of metal.

Thus, the contacting portion between the connection tube 34 and the latent heat exchanger 30 need to be electrically insulated.

Accordingly, the present invention provides an insulation packing 56 for the contacting portion between the connection tube 34 and the latent heat exchanger 30.

A combustion process of the condensing gas boiler having the above-described configuration will be described below.

When the pre-mixing burner 16 is activated to burn gas, exhaust gas passing through the present heat exchanger 20 passes through a spacing portion between the exhaust gas resistant bodies 25 which are arranged mutually spaced from each other, and goes forward the condensed waterspout 40.

Also, the exhaust gas is induced to the spacing portion spaced from the other wall surface 10b of the casing 10 below the lower portion of the condensed waterspout 40.

The induced exhaust gas is heat exchanged with the latent heat exchangers 30 arranged in duplicate in turn, below the exhaust gas flowing plate 50.

The condensed water produced during heat exchanging in the latent heat exchangers 30 is collected in the condensed waterspout 40 and then discharged through the condensed water exit 42.

The exhaust gas which has been heat exchanged while passing through the latent heat exchangers 30 in turn is induced to the spacing portion between one end of the exhaust gas flowing plate 50 and the one inner wall 10a of the casing 10, and then goes upwards to then be externally discharged through the upper exhaust gas exit 14 of the casing 10.

As described above, in the present invention, since the connection portion 54 and the end plate 21 are insulated with respect to the present and latent heat exchangers 20 and 30 made of the different kinds of metal, and the insulation packing 56 is interposed in the contacting area between the connection tubes 34 and the latent heat exchangers 30, galvanic corrosion or stay current corrosion caused by using the different kinds of metal used in the present and latent heat exchangers 20 and 30 can be suppressed, at an uptrend combustion process.

Thus, durability of the boiler can be remarkably enhanced to thereby heighten reliability of the boiler.

As described above, the present invention employs an unfavorable area ratio, or an insulator or an insulation coating process, at a contacting portion between the different kinds of metal used for the present and latent heat exchangers. As a result, galvanic corrosion or stay current corrosion can be suppressed to thereby enhance durability of the product, and heighten reliability thereof.

The present invention is not limited in the above-described embodiments. It is apparent to one who is skilled in the art that there are many variations and modifications without departing off the spirit of the present invention and the scope of the appended claims.

What is claimed is:

1. A condensing gas boiler having a corrosion prevention structure of preventing corrosion caused by using heterogeneous metal, the condensing gas boiler comprising:
    a casing provided with a combustion chamber therein;
    a present heat exchanger arranged in the casing, which includes a first tubular tube made of a copper material having a plurality first thermal pins formed by processing an outer circumferential surface;
    a latent heat exchanger disposed at a distance from the present heat exchanger, which includes a second tubular tube whose inner portion is made of a copper material and whose outer portion is made of aluminum, having a plurality second thermal pins formed by processing an outer circumferential surface;
    end plates contacting and engaged with each other while the present heat exchanger and the latent heat exchanger are fixedly arranged in respective rows and installed in the casing; and
    a plurality of connection tubes which are mutually connected through a connection portion so that water can circulate through the present heat exchanger and the latent heat exchanger,
    wherein connection tubes which are made of a corrosion-resistant material are installed to have a broader area, and simultaneously connection tubes which are made of a corrosion-easy material are installed to have a smaller area, to thereby suppress galvanic corrosion through an unfavorable area ratio, and
    wherein an insulator for electrical insulation is provided between the end plates.

2. The condensing gas boiler of claim 1, wherein at least a part of the connection portion is insulated.

3. The condensing gas boiler of claim 1, wherein an insulation packing is interposed between the connection portion and the latent heat exchanger, in order to insulate the contacting surface between the connection portion and the latent heat exchanger.

4. The condensing gas boiler of claim 1, wherein the insulator provided between the end plates, is an insulation material interposed between the end plates to accomplish an insulation packing.

5. The condensing gas boiler of claim 1, wherein the contacting surface of the end plates is electrically insulated and coated, as the insulator provided between the end plates.

* * * * *